United States Patent [19]

Price et al.

[11] 4,402,161

[45] Sep. 6, 1983

[54] CYLINDRICAL GRINDING MACHINE

[75] Inventors: Ralph E. Price; Jack D. Harrel, both of Waynesboro, Pa.

[73] Assignee: Litton Industrial Products, Inc., Waynesboro, Pa.

[21] Appl. No.: 308,232

[22] Filed: Oct. 2, 1981

[51] Int. Cl.³ .............................................. B24B 17/10
[52] U.S. Cl. ................................................. 51/101 R
[58] Field of Search ............. 51/101 R, 97 NC, 165.8, 51/165.77

[56] References Cited

U.S. PATENT DOCUMENTS

| | | | |
|---|---|---|---|
| 3,716,949 | 2/1973 | Price | 51/165.8 |
| 4,102,082 | 7/1978 | Katsumi | 51/101 R |
| 4,122,634 | 10/1978 | Nishimura | 51/101 R |
| 4,214,309 | 7/1980 | Koide | 51/97 NC |
| 4,299,061 | 11/1981 | Parnum | 51/101 R |

*Primary Examiner*—Harold D. Whitehead
*Attorney, Agent, or Firm*—Spencer T. Smith

[57] ABSTRACT

A cylindrical grinder for effecting stock removal from a cam surface on a workpiece comprising apparatus for supporting the workpiece for rotation about a predetermined axis, grinding assembly including a grinding wheel, apparatus for defining a selected velocity profile for each revolution of the workpiece, the velocity profile having a plurality of acceleration/deceleration segments each having first and second radiused end portions each terminating at one end tangential to the constant velocity direction, the defining apparatus including pulse driven stepping motor apparatus which will rotate the workpiece one complete revolution when issued a predetermined number of pulses, and pulse generating apparatus for driving the stepping motor apparatus including an oscillator for generating a continuous train of pulses at a fixed rate or frequency and divide by N apparatus for defining which pulses of the pulse train will be successively issued to the stepping motor apparatus so as to provide a selected velocity to the cam surface.

3 Claims, 6 Drawing Figures

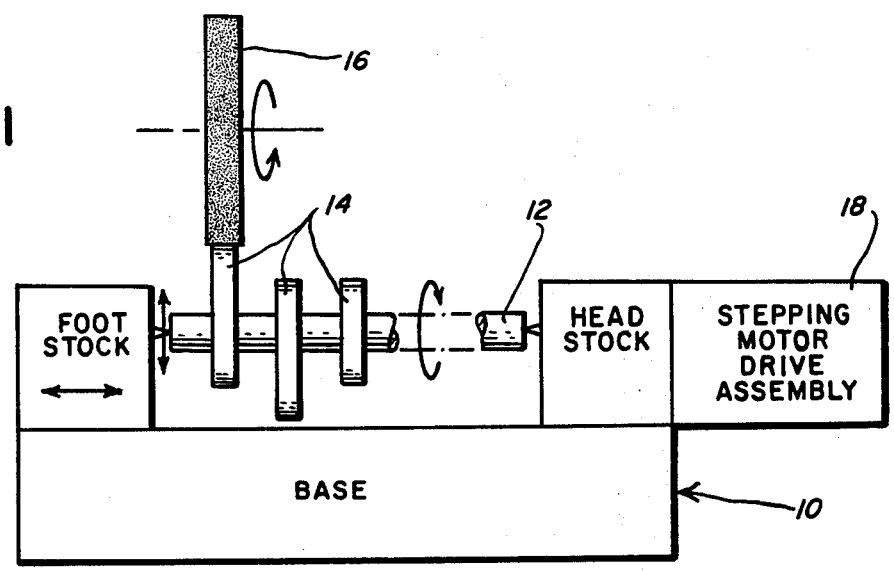
Fig_1
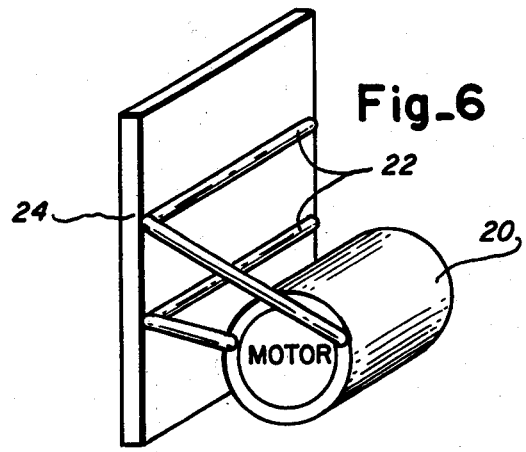
Fig_2
Fig_6
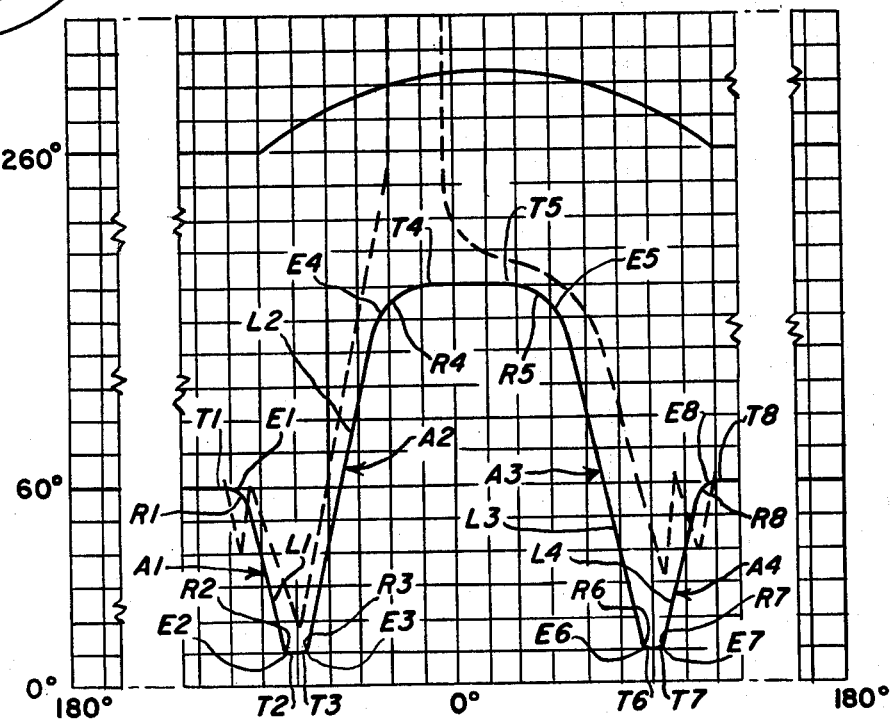
Fig_3

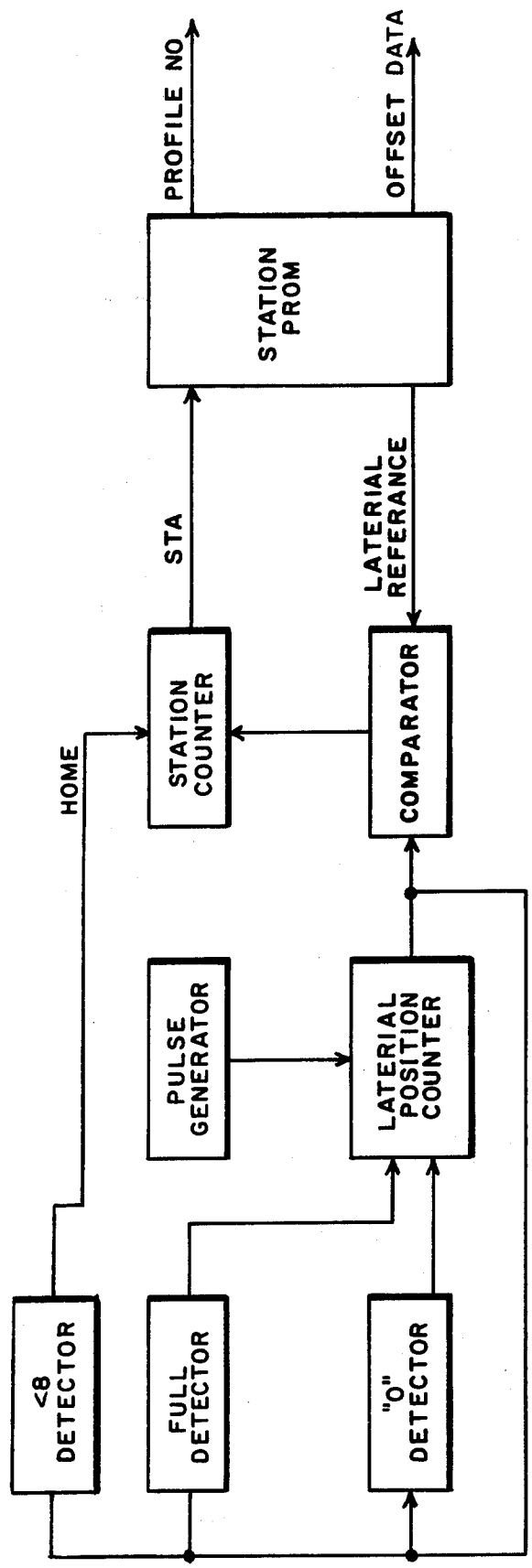
Fig_4

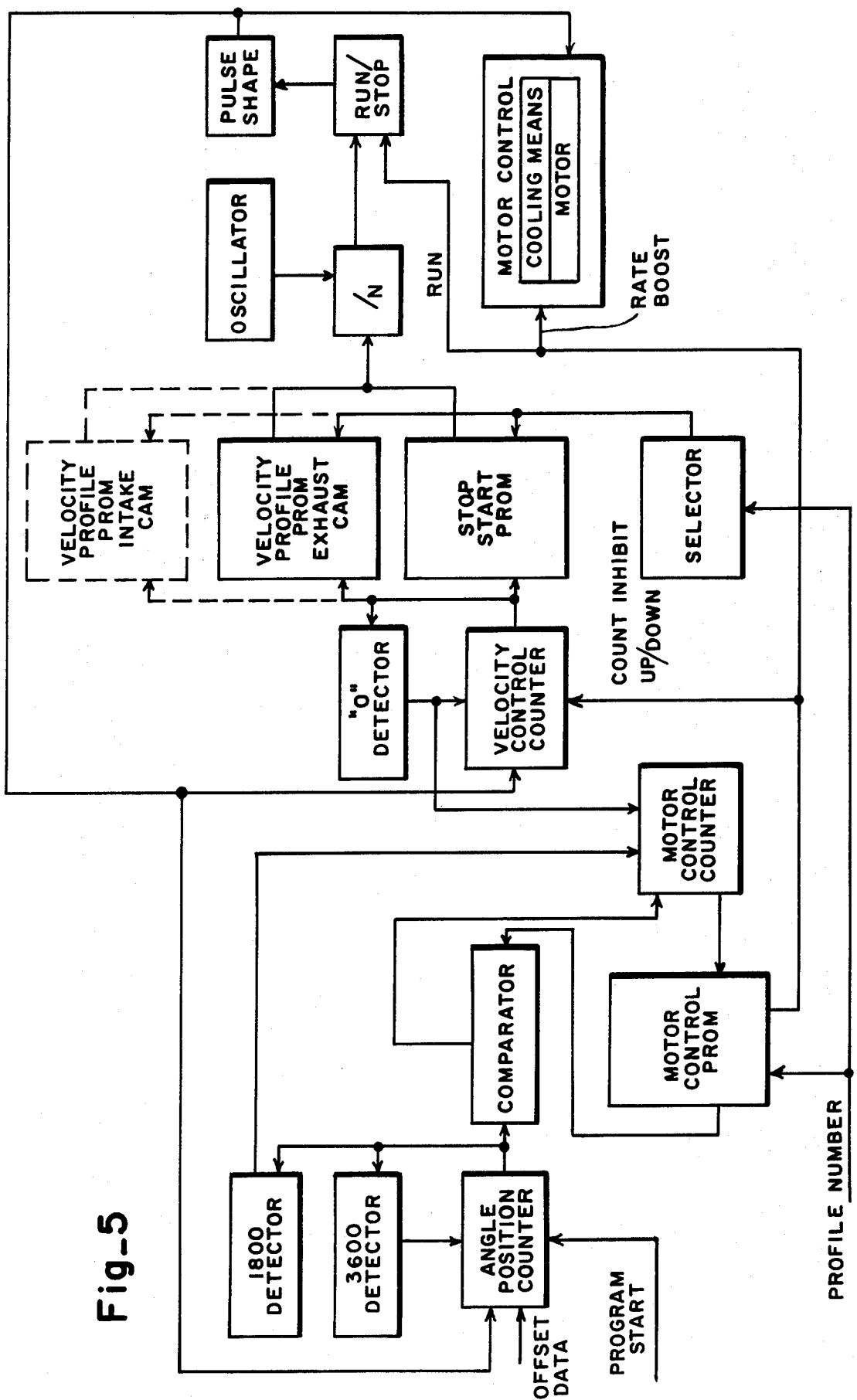
Fig_5

CYLINDRICAL GRINDING MACHINE

The present invention relates to cylindrical grinding machines and more particularly to cylindrical grinding machines which effect stock removal from a rotating workpiece such as a cam on a camshaft When grinding a normal cylindrical workpiece in a conventional cylindrical grinder, the workpiece is rotated on centers at a constant rate of revolutions per minute and the point of the grinding wheel contact with the workpiece progresses around the workpiece at a constant circumferential distance for each degree of workpiece rotation.

When grinding a normal automotive camshaft on a conventional automotive cam grinding when the workpiece is rotated on centers at a constant rate of revolutions per minute, the point of contact of the grinding wheel with the cam being ground progresses around the cam at a radically variable circumferential distance for each degree of rotation during some portions of the circumference.

This difference of circumferential distance of grinding wheel contact with the cam for each degree of rotation during these portions is caued by the shape of the cam as specified by the cam lift for each degree of rotation and the geometric effect of the compound relationship of the cam radius with the radius of the ginding wheel diameter and the rocking motion of the camshaft centers into and away from the grinding wheel as the rotation for grinding progresses.

These variable circumferential differences of the progress of the grinding wheel contact per degree of rotation of the cam being ground can be calculated by taking into account all of these factors. The speed of rotation of the cam being ground can be varied to provide a more uniform progression of the contact of the grinding wheel with the rotating cam.

To be effective, this variation of rotating speed must be programmed to be reduced before the critical change of progression of wheel contact speed on the flanks of the cam and the acceleration for a restoration of the cam rotating speed must be programmed to occur after the flanks are passed.

It is, accordingly, an object of the present invention to provide a cylindrical grinding machine for effecting stock removal from a cam or like workpiece which will achieve constant grinding wheel penetration around the cam.

Other objects and advantages of the present invention will become apparent from the following portion of this specification and from the accompanying drawings which illustrate, in accordance with the mandate of the patent statutes, a presently preferred embodiment incorporating the principles of the invention.

Referring to the drawings:

FIG. 1 is a schematic showing of the cam contour grinding machine made in accordance with the teachings of the present invention;

FIG. 2 is an elevational view of a representative cam ground on the machine illustrated in FIG. 1;

FIG. 3 is a graphical presentation illustrating a lift curve, a theoretical velocity profile and a command velocity profile for the cam illustrated in FIG. 2;

FIG. 4 is a schematic showing of the station identification circuit for the variable speed cam drive for the cam contour grinding machine illustrated in FIG. 1;

FIG. 5 is a schematic showing of the variable speed cam drive circuit for the cam contour grinding machine illustrated in FIG. 1; and FIG. 6 is an oblique view of the passive cooling system for the stepping motor shown schematically in FIG. 5.

A conventional cam contour grinding machine 10 includes opposing head and foot stock assemblies which are supported by a base. The camshaft 12 supported between the stocks includes a plurality of axially spaced cams 14. The stocks are laterally displaceable to axially index the camshaft to sequentially locate each cam in front of the grinding wheel assembly including a grinding wheel 16 which is advanceable in accordance with a predetermined infeed program to effect the desired grinding wheel penetration. To maintain the rotatably driven camshaft in constant contact with the rotating grinding wheel, the stocks are also conventionally selectively rockable to displace the camshaft towards and away from the grinding wheel.

Camshafts are utilized in internal combustion engines and include a plurality of cams which are associated with each cylinder. A camshaft for a gasoline engine has intake and exhaust cams, and a camshaft for a diesel engine has intake, exhaust and injector cams. Since the contour of these cams are different and since the orientation of one set of cams may be different than that of another set, a cam contour grinding machine conventionally includes a corresponding number of master cams (not shown) properly oriented to control the rocking motion for each cam on the camshaft.

Each cam generally includes a nose portion N, a base portion B defined by a radius R, and opposing flank portions F1, F2 which join the nose and base portions.

Since the base, which extends greater than 180°, is cylindrical relative to the axis of rotation of the camshaft, rotating the camshaft at a constant velocity ($V_b$) during the period that this portion contacts the grinding wheel will achieve uniform wheel penetration and uniform stock removal. In the preferred embodiment, the cam is rotated at a velocity of 60 rpm for approximately 210°. The cam is rotated at a second velocity ($V_f$) of 10 rpm along a portion of each flank F1, F2 and at a third velocity ($V_n$) of 120 rpm around the nose.

Acceleration (or deceleration) segments A1, A2, A3, A4 interconnect these constant velocity segments. An acceleration or deceleration segment includes two basic components; radiused end portions (E1, E2) (E3, E4), (E5, E6), (E7, E8) defined by radii (R1, R2), (R3, R4), (R5, R6), (R7, R8) which tangentially merge into their associated constant velocity segment. Such radiused portions may either tangentially merge into each other or they may tangentially interconnect with a linear inclined central portion L1, L2, L3, L4. The location where a constant velocity segment of the cam joins an acceleration or deceleration segment can be referred to as a set point (T1, . . . T8). The set point is preselected from programmed points on the cam contour.

The circuit for identifying the cam which is to be ground is shown in FIG. 4. The lateral position of the camshaft is indicated by a Lateral Position Counter driven by a suitable Pulse Generator and the predetermined lateral positions of the camshaft for aligning each cam with the grinding wheel contained in the Station Prom (Programmable read only memory), are compared by a Comparator. When the compared data matches, the Comparator drives a Station Counter which provides the Station Prom with a binary number identifying the cam which is aligned with the grinding wheel. The Station Prom issues a profile number defining the type of cam (intake, exhaust or injector, for example) and an offset which, in effect, will reorient the cam to a desired standard orientation.

This data is supplied to the variable speed cam drive circuit (FIG. 5). The profile number is supplied to the Selector which selects the set points and velocity profile prom for the cam to be ground. The offset data is loaded into the angle position counter by a Program Start signal which occurs once for every cam revolution. An identical program will be repeated for each complete revolution until sufficient stock removal has been removed from all portions of the cam.

The camshaft is rotatably driven by a stepping motor (Motor Control) which is driven by the clock frequency of the Oscillator divided by the "N" number. An oscillator generates a continuous train of pulses at a fixed rate or frequency. An individual pulse from this train issued to the stepping motor will drive the stepping motor one pulse and a predetermined number of pulses issued to the stepping motor will effect one complete revolution. A divide by "N" circuit defines which pulse in the generated pulse train will be the next pulse to pass therethrough and, hence, what time interval between two successive pulses. Stated differently, a divide by "N" circuit will block any selected number of pulses of the train, following a selected pulse, from issuing to the stepping motor. As a camshaft is rotatively driven by the Motor Control through a complete revolution, the Angle Position Counter will be updated by each pulse. If the grinding wheel is contacting a constant velocity segment, the Motor Control Prom will generate a count inhibit (CI) signal which will continue the status of the Motor Control. The address of the divide by N number will, accordingly, remain the same along a constant velocity segment with the stepping motor running at that constant velocity.

When a specific set point is reached, the Motor Control Prom will generate a signal directing the velocity control to either up count or down count, and will delete the count inhibit signal.

As already noted, the set point locates the point on the velocity profile where an acceleration/deceleration segment joins a constant velocity segment. Along a constant velocity segment, the time interval between each pulse will be constant (the N number will not change). To change the velocity, the time interval between each successive pulse generated during a change of velocity will be selected to conform to the profile of the preselected acceleration/deceleration segment. The address will be changed for each successive count throughout the duration of an acceleration/deceleration segment to vary the N number for each successive pulse. Accordingly, a different pulse rate will be established for every step of the stepping motor when proceeding along an acceleration/deceleration segment. When, for example, the velocity is to be reduced, the time interval between successive pulses will be increased (the number of pulses blocked between issued pulses will have to be increased) and this will be effected by changing the N number of the divide by "N" circuit.

When the next set point is supplied from the Angle Position Counter to the Comparator indicating the transition from an acceleration/deceleration segment to a constant velocity segment, a count inhibit signal will again be generated to continue the status of the Motor Control with the stepping motor being driven at the existing velocity.

Each Velocity Profile Prom will contain addressable N numbers defining each of the plurality of acceleration/deceleration velocity profile segments present in the velocity profile for a specified cam. Where the cam is symmetrical, the count direction may be programmed to reverse so that the acceleration/deceleration segment on the back side of the cam will be the mirror image of the acceleration/deceleration segment on the front side.

In the event any slippage is encountered, a synchronization signal will confirm that a velocity profile is commencing at the same point on the cam for each revolution.

A stepping motor is conventionally utilized as a positioning motor and not as a driving motor as is the case herein. The repetitive acceleration and deceleration of the stepping motor as a drive motor under the disclosed duty cycle raises its temperature beyond intended limits. A heat sink, here in the form of a passive cooling system structure is provided for the motor (FIG. 6). The cooling system includes a jacket 20 which encloses the motor and absorbs heat generated by the motor, a plurality of heat pipes 22 normally containing freon and a heat dissipating structure, here in the form of a finned plate 24. With such a passive system, the greater the heat generation, the greater the heat dissipation whereby the temperature of the motor can be maintained below its maximum operating temperature.

What is claimed is:

1. A cylindrical grinder for effecting stock removal from a cam surface on a workpiece comprising:
    means for supporting the workpiece for rotation about a predetermined axis,
    grinding assembly means including a grinding wheel,
    means for defining a selected velocity profile for each revolution of the workpiece, the velocity profile having a plurality of acceleration/deceleration segments each having a first and second radiused end portions each terminating at one end tangential to the constant velocity direction, said defining means including
        pulse driven stepping motor means which will rotate the workpiece one complete revolution when issued a predetermined number of pulses, and
        pulse generating means for driving said stepping motor means including an oscillator for generating a continuous train of pulses at a fixed rate or frequency and divide by N means for defining which pulses of the pulse train will be successively issued to said stepping motor means, and
        means for commanding a selected N number for said divide by N means for each pulse of said predetermined number of pulses to be issued to said stepping motor means thereby defining said selected velocity profile having a plurality of acceleration/deceleration segments each having first and second radiused end portions each terminating at one end tangential to the constant velocity direction whereby the time interval between each two successive pulses issued to said stepping motor means being driven along a velocity profile including a plurality of acceleration/deceleration segments will be discrete and predetermined.

2. A cylindrical grinding machine according to claim 1 for effecting stock removal from a plurality of different cam configuration wherein said commanding means comprises a velocity profile prom for each different cam configuration.

3. A cylindrical grinding machine according to claim 2, wherein said defining means includes means for defining linear constant acceleration/deceleration portions tangentially merging with said first and second radiused end portions of each of said acceleration/deceleration segments.

* * * * *